(12) United States Patent
Sugiyama et al.

(10) Patent No.: US 9,645,828 B2
(45) Date of Patent: May 9, 2017

(54) METHOD OF SEARCHING CHARACTER STRING, CHARACTER STRING SEARCHING DEVICE, AND RECORDING MEDIUM

(71) Applicant: FUJITSU LIMITED, Kawasaki-shi, Kanagawa (JP)

(72) Inventors: Kokichi Sugiyama, Numazu (JP); Takayuki Sano, Atami (JP); Naohiro Itou, Numazu (JP); Mikio Yoshida, Numazu (JP); Toshiyuki Kurokawa, Numazu (JP); Motonori Yoshinaga, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 515 days.

(21) Appl. No.: 14/287,634

(22) Filed: May 27, 2014

(65) Prior Publication Data

US 2014/0358965 A1 Dec. 4, 2014

(30) Foreign Application Priority Data

May 30, 2013 (JP) ................................. 2013-114677

(51) Int. Cl.
*G06F 9/30* (2006.01)
*G06F 9/38* (2006.01)
(Continued)

(52) U.S. Cl.
CPC ........ *G06F 9/3887* (2013.01); *G06F 15/8007* (2013.01); *G06F 17/30985* (2013.01); *G06F 2207/025* (2013.01)

(58) Field of Classification Search
None
See application file for complete search history.

(56) References Cited

U.S. PATENT DOCUMENTS 4,979,101 A * 12/1990 Takahashi ................. G06F 7/02
5,777,608 A * 7/1998 Lipovski ................... G06F 7/02
345/519

(Continued)

FOREIGN PATENT DOCUMENTS

EP 0477989 4/1992
JP 1-224831 9/1989

(Continued)

OTHER PUBLICATIONS

Japanese Office Action mailed Nov. 29, 2016 in related Japanese Application No. 2013-114677.

*Primary Examiner* — Corey S Faherty
(74) *Attorney, Agent, or Firm* — Staas & Halsey LLP

(57) ABSTRACT

A method includes comparing, in units of a first bit length, a first bit sequence of the first bit length included in a search character bit sequence to a second bit sequence of a second bit length included in a target character bit sequence; when a third bit sequence of the first bit length following the first bit sequence in the search character bit sequence matches a fourth bit sequence of the first bit length following a location matching the first bit sequence in the second bit sequence, creating a fifth bit sequence of the second bit length starting from a location matching the first bit sequence in the target character bit sequence; comparing, in units of the first bit length, the fifth bit sequence to a sixth bit sequence of the second bit length starting from the first bit sequence in the search character bit sequence; and determining.

20 Claims, 10 Drawing Sheets

(51) Int. Cl.
*G06F 15/80* (2006.01)
*G06F 17/30* (2006.01)

(56) References Cited

U.S. PATENT DOCUMENTS

| | | | | |
|---|---|---|---|---|
| 6,094,443 A | * | 7/2000 | Dwork | G06F 7/02 370/510 |
| 6,282,318 B1 | * | 8/2001 | Dietrich | G06F 7/02 382/209 |
| 2008/0077773 A1 | | 3/2008 | Julier et al. | |

FOREIGN PATENT DOCUMENTS

| | | |
|---|---|---|
| JP | 4-033163 | 2/1992 |
| JP | 4-137166 | 5/1992 |
| JP | 2002-312364 | 10/2002 |
| JP | 2010-504594 | 2/2010 |

\* cited by examiner

METHOD OF SEARCHING CHARACTER STRING, CHARACTER STRING SEARCHING DEVICE, AND RECORDING MEDIUM

CROSS-REFERENCE TO RELATED APPLICATION

This application is based upon and claims the benefit of priority of the prior Japanese Patent Application No. 2013-114677, filed on May 30, 2013, the entire contents of which are incorporated herein by reference.

FIELD

The embodiments discussed herein are related to a method of searching character string, a character string searching device, and a recording medium.

BACKGROUND

In the related art, there is an established technology that searches for a character string by comparing a pattern character string against a target character string in 1-byte units. According to this technology, when searching for a pattern character string "queen" against a target character string "The quick brown fox", for example, after comparing the 5th byte "q" and the 6th byte "u" of the target character string, it is determined that the search result is different by a comparison of the 7th byte "i" of the target character string and "e" of the pattern character string.

In addition, there is an established technology that checks a pattern character string against a target character string by using a state transition diagram. A state transition diagram is a diagram that represents how states transition. By conducting a search using a state transition diagram, in the above example, after comparison of the 7th byte "i" of the target character string and "e" of the pattern character string finishes, the next search start position is controlled to become the 8th byte of the target character string, for example.

Also, there is an established technology that uses multiple registers to execute part of the search process that searches for a character string with hardware processing. Specifically, a device of the related art holds long-data-length data from the checking or checked character string in a first register, and shiftably holds short data in a second register. Also, a device of the related art temporarily holds in a third register data of the first character of the character string held in the second register, such that the size of the data is equal to the size of the character string held in the first register, and holds the computational result of the exclusive OR of the character string data held in the first register and the third register. In addition, the device of the related art shifts the character string in the second register by this computational result, and judges whether or not to output a search result or whether or not to shift further according to the computational result of the exclusive OR of the data held in the first register and the second register, and the shift position of the character string in the second register.

However, according to the technology of the related art, there is a problem in that if the target character string or pattern character string becomes longer, the processing time taken by a character string search greatly increases. For example, when a disparity is found between the target character string and the pattern character string, the search process is conducted again starting from the character string one byte later in the target character string, which leads to great increases in the processing time taken by a character string search. Also, in the case of creating a state transition diagram every time a search is conducted, the processing load for creating a state transition diagram increases greatly. Also, in the case of processing the pattern character string itself, another shift process is conducted when searching for the same character string again, leading to great increases in the processing time taken by a character string search.

Japanese Laid-open Patent Publication No. 2002-312364 is known as the related art, for example.

SUMMARY

According to an aspect of the invention, a method includes: first comparing, in units of a first bit length, a first bit sequence of the first bit length included in a search character bit sequence corresponding to a search character string to a second bit sequence of a second bit length included in a target character bit sequence corresponding to a target character string; when a third bit sequence of the first bit length following the first bit sequence in the search character bit sequence matches a fourth bit sequence of the first bit length following a location matching the first bit sequence in the second bit sequence, creating a fifth bit sequence of the second bit length starting from a location matching the first bit sequence in the target character bit sequence; second comparing, in units of the first bit length, the fifth bit sequence to a sixth bit sequence of the second bit length starting from the first bit sequence in the search character bit sequence; and determining, based on a result of the second comparing, whether or not the search character string is included in the target character string.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of a character string searching method, a character string searching device, and a character string searching program recorded onto a recording medium will be described in detail with reference to the drawings.

Working Example of Character String Searching Method

Figure 1:
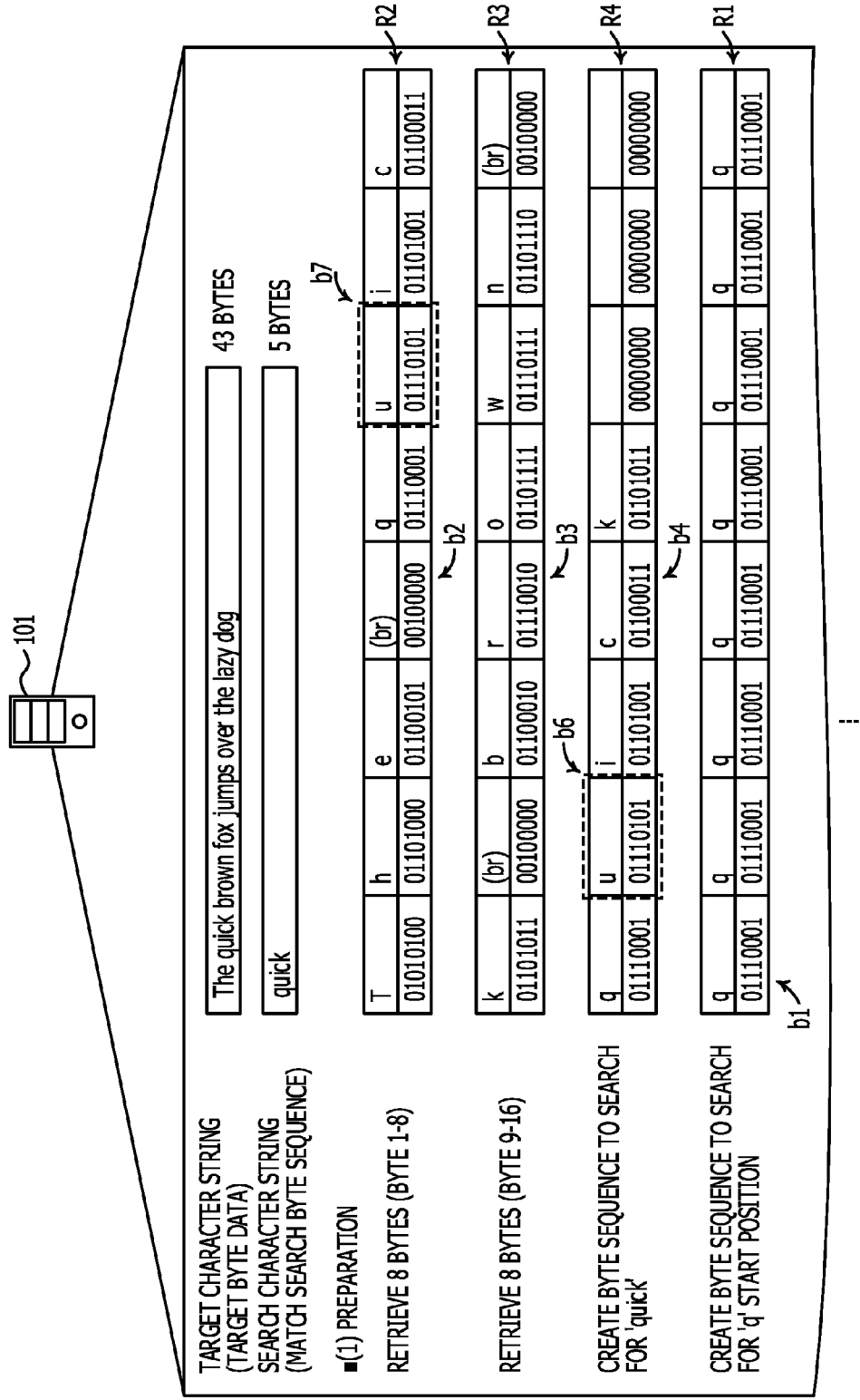
FIGS. 1 and 2 illustrate a working example of a character string searching method according to an embodiment.
Figure 2:
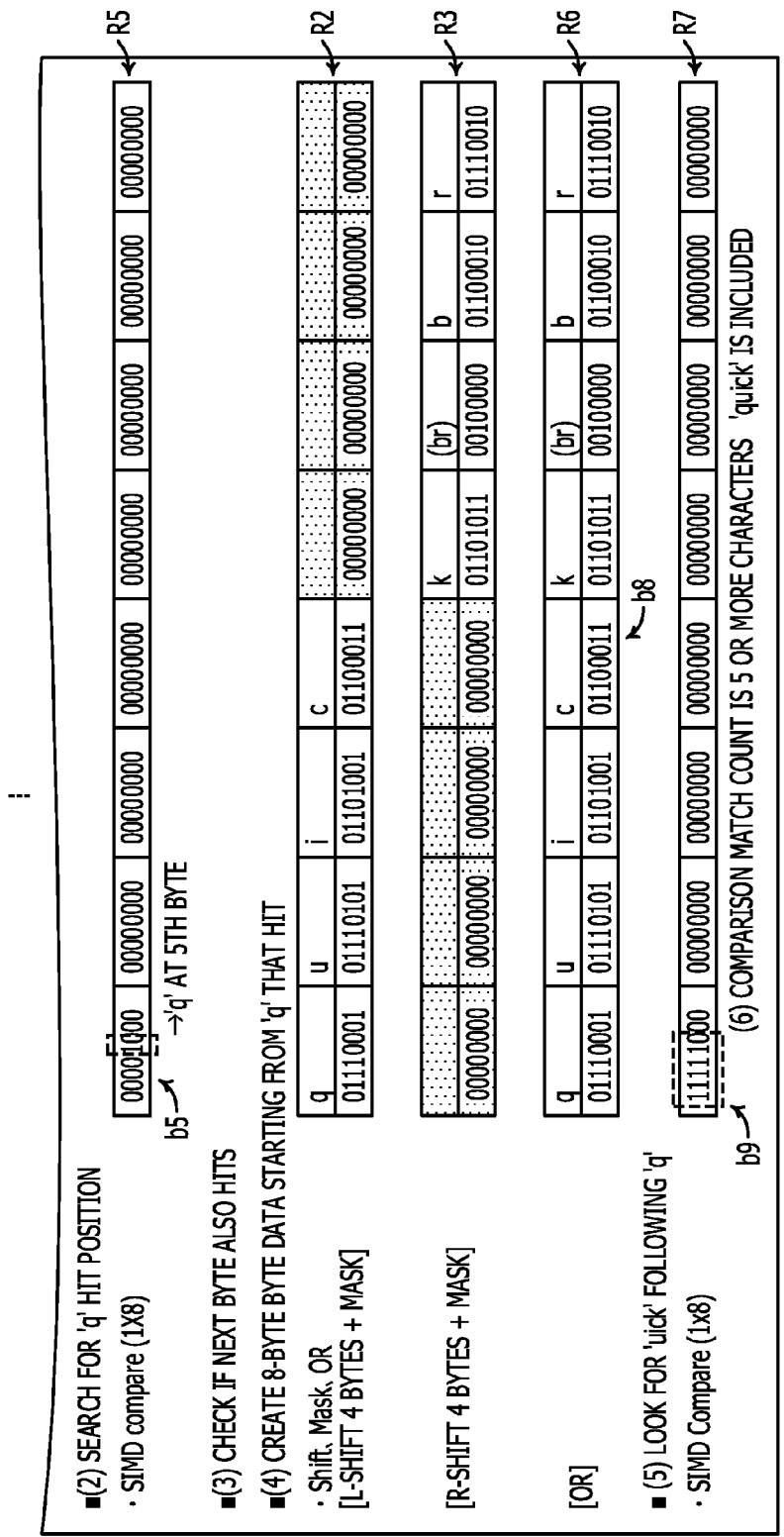

FIGS. 1 and 2 illustrate a working example of a character string searching method according to an embodiment. In FIG. 1, a character string searching device 101 is a computer that searches for a search character string from a target character string. The search character string is the character string to search for. The target character string is the character string that is searched.

At this point, consider, as a technology that searches for a search character string from a target character string, conducting character string matching with a search character string, in which a specific compare instruction (for example, SIMD Compare) is used to batch compare the first character of the search character string and the target character string, and detect the first character of the search character string from the target character string. In other words, consider conducting a preliminary screening of detecting locations that match the first character of the search character string from the target character string, and then conducting more advanced character string search.

A single instruction, multiple data (SIMD) instruction refers to processing multiple data points with a single instruction. However, using a SIMD instruction may mean respecting an 8-byte boundary. For this reason, depending on the comparison result of a batch comparison between the first character of the search character string and the target character string, data of the target character string inside a register is shifted or masked and then an OR is taken in order to process the data into a form that may be compared to the search character string by the SIMD instruction, for example.

In this case, by using a specific bit operation instruction (for example, Shift-Mask-OR) to process data of the target character string inside a register, the processing time taken by data processing is shortened compared to the case of executing the Shift, Mask, and OR as respectively independent instructions.

However, in the case of conducting the Shift-Mask-OR and the SIMD Compare individually, even on candidates that just happen to match the first character only, there is an increased penalty due to conducting an advanced search and returning no match when the first character is a character with a high frequency of appearance. Furthermore, some characters are what are called multibyte characters, in which a single character is expressed with multiple bytes.

With multibyte characters, even if characters do not match completely, there still exist many combinations of matching bit sequences, and simply screening with an SIMD Compare may in some cases lead to conducting the Shift-Mask-OR and the SIMD Compare individually on excess candidates whose first characters do not even match.

Established examples of multibyte character encodings include Shift_JIS (SJIS) and Unicode Transformation Format-8 (UTF-8). On the other hand, an established example of a single-byte character encoding, in which one character is expressed with one byte, is the American Standard Code for Information Interchange (ASCII).

Herein, an example for the case of SJIS encoding will be described as a specific example of the case of increasing penalty. SJIS is a character encoding that expresses one character with two bytes. Assume that the target character string is "デジタルーテレビの普及" and the search character string is "テレビ". Expressed in SJIS, the target character string "デジタル テレビの普及" and the search character string "テレビ" become the following. Herein, the numbers in parenthesis to the right of each character are the data expressing each character (in the form 0xNNNN, where NNNN are the numbers indicated below).

[Target character string] デ (83 66) ジ (83 57) タ (83 5E) ル (83 8B) _ (81 7C) テ (83 65) レ (83 8C) ビ (83 72) の (82 CC) 普 (95 81) 及 (8B 79)

[Search character string] テ (83 65) レ (83 8C) ビ (83 72)

In SJIS, since the first byte of katakana characters is "83", a check of just the first byte of the search character string will return all katakana characters included in the target character string as hits. Processing the target character string as an 8-byte character string and conducting an 8-byte comparison with an SIMD instruction for every hit leads to great increases in the processing time taken by character string search.

Accordingly, in the present embodiment, the character string searching device 101 uses an SIMD instruction to detect from the target character string a location that matches the first byte of the search character string, and if the next byte also matches the search character string, processes that location into a bit sequence that may be compared with an SIMD instruction, and conducts an advanced search, for example. Consequently, excessive advanced searching is potentially minimized, and the processing time taken by character string search is potentially shortened.

Hereinafter, an example of a character string search process of the character string searching device 101 will be described. Herein, assume that the encoding is ASCII, the search character string is "quick", and the target character string is "The quick brown fox jumps over the lazy dog".

(1) The character string searching device 101 stores a bit sequence b1 with a first bit length l1 included in a bit sequence expressing the search character string in a register R1, such that the total length of the stored bit sequences b1 is equal to a second bit length l2. Herein, the first bit length l1 is the number of bits forming a unit of processing by a specific compare instruction (for example, SIMD Compare). The first bit length l1 is 1 byte (8 bits), 2 bytes, or 3 bytes, for example.

Meanwhile, the second bit length l2 is a bit length that is X times the first bit length l1 (where X is a natural number equal to or greater than 2), and is the bit length of data processed in one cycle by the specific compare instruction (for example, SIMD Compare). The second bit length l2 is 8 bytes, 16 bytes, or 32 bytes, for example. In the following description, the first bit length l1 is taken to be 1 byte, and the second bit length l2 is taken to be 8 bytes.

As a specific example, the character string searching device 101 stores 8 bytes' worth of a 1-byte bit sequence b1 from the start of a bit sequence expressing the search character string in the register R1. In the example in FIG. 1, the bit sequence b1 "01110001" expressing the first character "q" of the search character string is stored in the register R1 eight times.

Additionally, the character string searching device 101 stores an 8-byte bit sequence b2 from the start of a bit sequence expressing the target character string in a register R2. The character string searching device 101 also stores the next 8-byte bit sequence b3 after the bit sequence b2 from the bit sequence expressing the target character string in a register R3.

Note that when there is not 8 bytes' worth of a bit sequence from the start of a bit sequence expressing the target character string, a bit sequence from the start to the end of the bit sequence expressing the target character string is stored in the register R2. Also, when there is not the next 8 bytes' worth of a bit sequence after the bit sequence b2 from the bit sequence expressing the target character string, the bit sequence from the next bit after the bit sequence b2 to the end of the bit sequence expressing the target character string is stored in the register R3.

In the example in FIG. 1, a bit sequence b2 expressing the character string "The(br)quic" of the first eight characters of the target character string is being stored in the register R2. Note that "(br)" represents a blank space. Also, a bit sequence b3 expressing the character string "k(br)brown (br)" of the eight characters starting from the ninth character of the target character string is being stored in the register R3.

Also, the character string searching device 101 stores an 8-byte bit sequence b4 from the start of a bit sequence expressing the search character string in a register R4. Note that when there is not 8 bytes' worth of a bit sequence from the start of a bit sequence expressing the search character string, the bit sequence from the start to the end of the bit sequence expressing the search character string is stored in the register R4.

In the example in FIG. 1, a bit sequence b4 expressing the character string "quick" of the first five characters of the search character string is being stored in the register R4. Also, the default value of each bit stored in each register R is 0. For this reason, the value of each bit in the 6th and subsequent bytes of the register R4 is 0.

(2) The character string searching device 101 executes a first compare instruction that batch compares, in units of bytes, the 1-byte bit sequence b1 included in the bit sequence expressing the search character string and the 8-byte bit sequence b2 included in the bit sequence expressing the target character string. As a specific example, the character string searching device 101 batch compares the bit sequence stored in the register R1 and the bit sequence stored in the register R2 in units of bytes by executing SIMD Compare. With SIMD Compare, it is possible to batch compare multiple points of data (8-bit unsigned integers) to each other with a single instruction.

In the example in FIG. 2, a bit sequence b5 expressing a comparison result of the first compare instruction is being stored in a register R5. Specifically, the bit sequence b5 expresses a compare result of the first compare instruction in units of bytes. Herein, "1" indicates that byte units of data in the registers R1 and R2 match, while "0" indicates that byte units of data in the registers R1 and R2 do not match. Note that for portions set to the default value inside the registers R, data is not compared, or the comparison result returns a non-match, for example.

With the bit sequence b5, the hit position of the bit sequence b1 expressing the first character of the search character string in the bit sequence expressing the target character string may be specified. This example demonstrates that the bit sequence b1 expressing the first character "q" of the search character string exists at the 5th byte of the bit sequence expressing the target character string.

(3) The character string searching device 101, based on the comparison result of the first compare instruction, compares the next 1-byte bit sequence b6 after the bit sequence b1 in the bit sequence expressing the search character string to the next 1-byte bit sequence b7 after the location that matches the bit sequence b1 in the bit sequence b2. Herein, the bit sequence b6 is a bit sequence expressing the second character "u" of the search character string. Also, the bit sequence b7 is a bit sequence expressing the next character "u" of the target character string that follows after the 5th character "q" that matches the first character "q" of the search character string.

In other words, the character string searching device 101 checks whether or not the next byte after the first byte in a bit sequence expressing a search character string also returns a hit in a bit sequence expressing a target character string. In the example in FIG. 1, the bit sequence b6 "01110101" and the bit sequence b7 "01110101" match. Accordingly, this example demonstrates that the next character after the first character of the search character string also returns a hit in the target character string.

(4) When the bit sequence b6 and the bit sequence b7 match, the character string searching device 101 executes a bit operation instruction that generates an 8-byte bit sequence b8 from the location matching the bit sequence b1 in the bit sequence expressing the target character string. Herein, the bit operation instruction refers to Shift-Mask-OR, for example.

Shift-Mask-OR is an instruction that executes a "Shift", a "Mask", and an "OR" on two registers with a single instruction. Shift is an operation that shifts a bit sequence to the left or right. Mask is an operation that toggles a given bit on (1) or off (0). OR is an operation that takes the logical sum (OR) of respective bits at the same position in two bit sequences of equal length, and outputs a bit sequence of equal length.

As a specific example, first, the character string searching device 101 left-shifts the register R2 so that the location matching the bit sequence b1 is brought to the beginning. As a more specific example, the character string searching device 101 left-shifts the register R2 by the number of times "0" appeared before "1" appeared from the start of the bit sequence b5 expressing the comparison result of the first compare instruction. In the example in FIG. 2, the register R2 is left-shifted by four bytes. Subsequently, the character string searching device 101 masks the bits of the shift origin (the emptied bits) of the register R2 with "0". In the example in FIG. 2, the 4-byte bit sequence on the right side of the register R2 is masked with "0".

In addition, the character string searching device 101 right-shifts the register R3 by the value obtained by subtracting from the register size (8 bytes) the number of times "0" appeared before "1" appeared from the start of the bit sequence b5. In the example in FIG. 2, the register R3 is right-shifted by four bytes. Subsequently, the character string searching device 101 masks the bits of the shift origin (the emptied bits) of the register R3 with "0". In the example in FIG. 2, the 4-byte bit sequence on the left side of the register R3 is masked with "0".

Subsequently, the character string searching device 101 stores in a register R6 a bit sequence b8 obtained by concatenating the bit sequence in the register R2 and the bit sequence in the register R3 with an OR instruction. Consequently, it is possible to generate from the bit sequence expressing the target character string an 8-byte bit sequence b8 that starts from "q" matching the first character of the search character string.

(5) The character string searching device 101 executes a second compare instruction that batch compares, in units of bytes, the generated bit sequence b8 and the 8-byte bit sequence b4 from the start of the bit sequence expressing the search character string. As a specific example, the character string searching device 101 batch compares the bit sequence b8 stored in the register R6 and the bit sequence stored in the register R4 in units of 1 byte by executing SIMD compare.

In the example in FIG. 2, a bit sequence b9 expressing a comparison result of the second compare instruction is being stored in a register R7. Specifically, the bit sequence b9 expresses a compare result of the second compare instruction in units of bytes. Herein, "1" indicates that byte units of data in the registers R4 and R6 match, while "0" indicates that byte units of data in the registers R4 and R6 do not match.

(6) The character string searching device 101, based on the comparison result of the second compare instruction, determines whether or not the search character string is included in the target character string. In the example in FIG. 2, "1" is repeated five times from the start of the bit sequence b9, indicating that at least five consecutive characters were compared and found to be matching. In addition, the search character string is five characters. In this case, the character string searching device 101 determines that the search character string is included in the target character string.

In this way, according to the character string searching device 101, a specific compare instruction (for example, SIMD Compare) may be used to quickly conduct a preliminary screening, and an advanced search for a character string using a specific bit operation instruction (for example, Shift-Mask-OR) and a specific compare instruction may be conducted efficiently.

Consequently, excessive advanced searching may be minimized, and the processing time taken by character string search may be shortened. As a specific example, in the case of single-byte characters, it is possible to reduce excess processing that conducts Shift-Mask-OR and SIMD Compare on candidates that just happen to match the first character only. As another example, in the case of multibyte characters, it is possible to reduce excess processing that conducts Shift-Mask-OR and SIMD Compare individually on candidates whose first characters do not even match.

Exemplary System Configuration of System 300

Next, an exemplary system configuration of a system 300 according to an embodiment will be described. Herein, the case of applying the character string searching device 101 illustrated in FIG. 1 to a database server 301 inside a system 300 will be described as an example.

Figure 3:
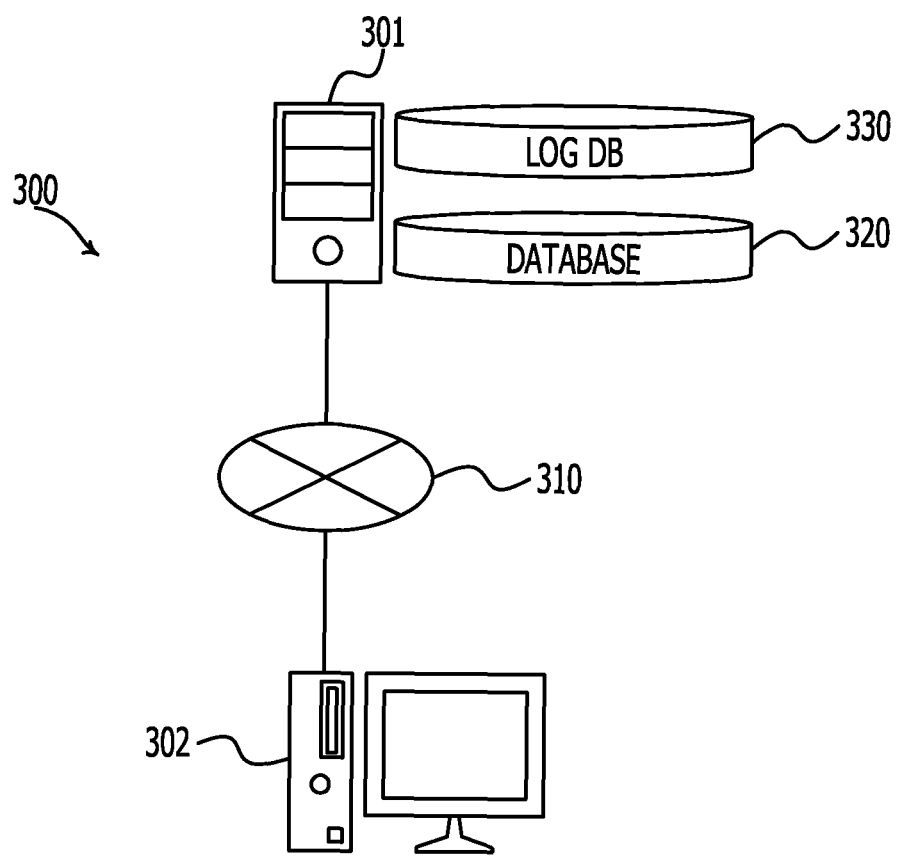
FIG. 3 illustrates an exemplary system configuration of a system.

FIG. 3 illustrates an exemplary system configuration of a system 300. In FIG. 3, the system 300 includes a database server 301 and a client device 302. In the system 300, the database server 301 and the client device 302 are coupled via a wired or wireless network 310. The network 310 may be a local area network (LAN), a wide area network (WAN), a mobile communication network, or the Internet, for example.

The database server 301 is a computer capable of accessing a database 320 and a log database (DB) 330. The database 320 stores data shared by multiple applications and users. The log DB 330 records temporary logs and archive logs. A temporary log is a log indicating an update history of the database 320. An archive log is a log used when restoring the database 320.

The database server 301, upon receiving a data search request from the client device 302, loads data from the database 320 into memory (for example, the memory 402 illustrated in FIG. 4 discussed later). Subsequently, the database server 301 searches the data loaded into memory, and transmits the search result to the client device 302.

As a more specific example, the database server 301 includes a receiving unit, a data operation unit, a record operation unit, a buffer management unit, a transaction management unit, an update management unit, a log management unit, and the like (not illustrated). The receiving unit receives a data search request from the client device 302. The data search request is a Structured Query Language (SQL) operation on the database 320, for example.

The data operation unit creates an access procedure, and requests data access from the transaction management unit and the record operation unit. The record operation unit searches and updates collections of data called records. Note that the record operation unit corresponds to the functional units of the database server 301 illustrated in FIG. 5 discussed later, for example.

The buffer management unit controls buffer access that manages database access in memory. The transaction management unit/update management unit controls the validation and invalidation of changes to the database 320. The log management unit manages temporary log file and archive log file I/O.

The client device 302 is a computer used by a user of the system 300. As a specific example, the client device 302 is a personal computer (PC), a laptop, a smartphone, a mobile phone, tablet, or the like.

Exemplary Hardware Configuration of Database Server 301

Figure 4:
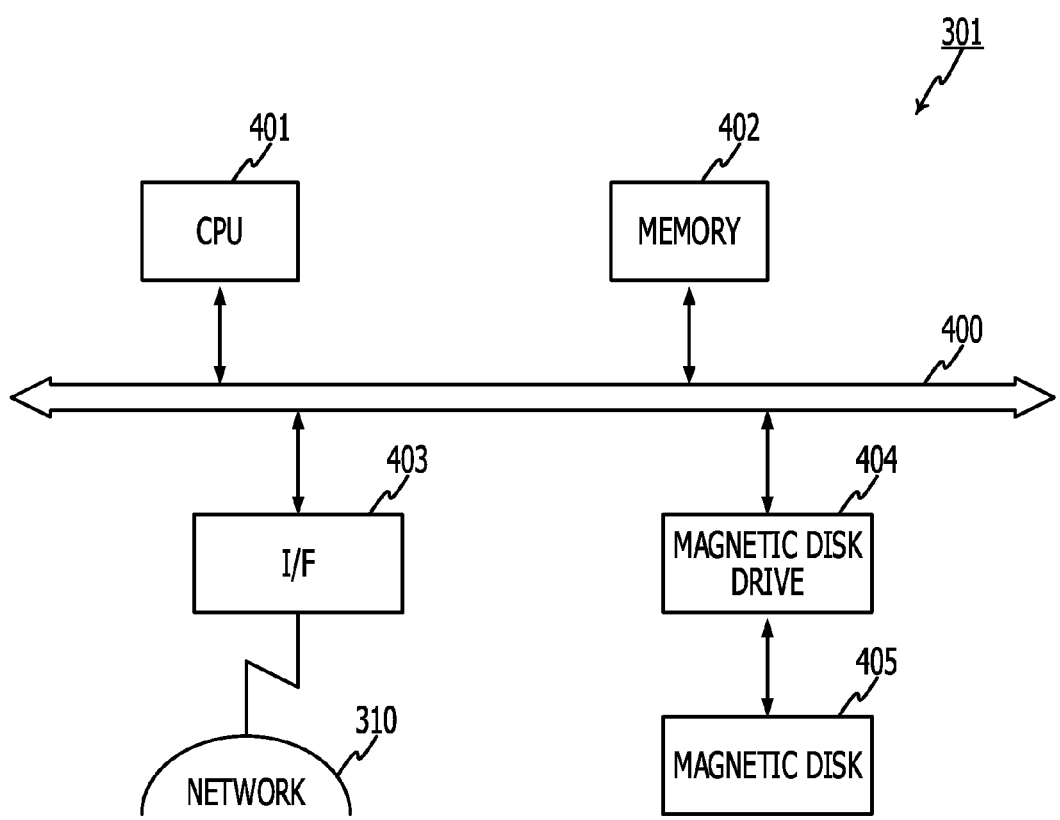
FIG. 4 illustrates an exemplary hardware configuration of a database server.

FIG. 4 illustrates an exemplary hardware configuration of a database server 301. In FIG. 4, the database server 301 includes a central processing unit (CPU) 401, memory 402, an interface (I/F) 403, a magnetic disk drive 404, and a magnetic disk 405. The respective components are also coupled to each other by a bus 400.

Herein, the CPU 401 administers overall control of the database server 301. The memory 402 may include read-only memory (ROM), random access memory (RAM), and flash ROM, for example. As a specific example, the flash ROM and ROM store various programs, while the RAM is used as a work area of the CPU 401. A program stored in the memory 402 is loaded by the CPU 401, thereby causing the CPU 401 to execute a process coded therein.

The I/F 403 is coupled to the network 310 via a communication link, and is coupled to another computer (for example, the client device 302 illustrated in FIG. 3) via the network 310. In addition, the I/F 403 administers the internal interface with the network 310, and controls the input and output of data from other computers. For the I/F 403, a modem, LAN adapter, or the like may be adopted, for example.

The magnetic disk drive 404 controls reading/writing of data with respect to the magnetic disk 405, under control by the CPU 401. The magnetic disk 405 stores data written under control by the magnetic disk drive 404.

Note that the database server 301 may also be configured such that, besides the components discussed above, a solid-state drive (SSD), a keyboard, a mouse, a display, and the like are also included, for example. Additionally, the client device 302 illustrated in FIG. 3 may also be realized by an exemplary hardware configuration similar to that of the database server 301 discussed above.

Exemplary Functional Configuration of Database Server 301

Figure 5:
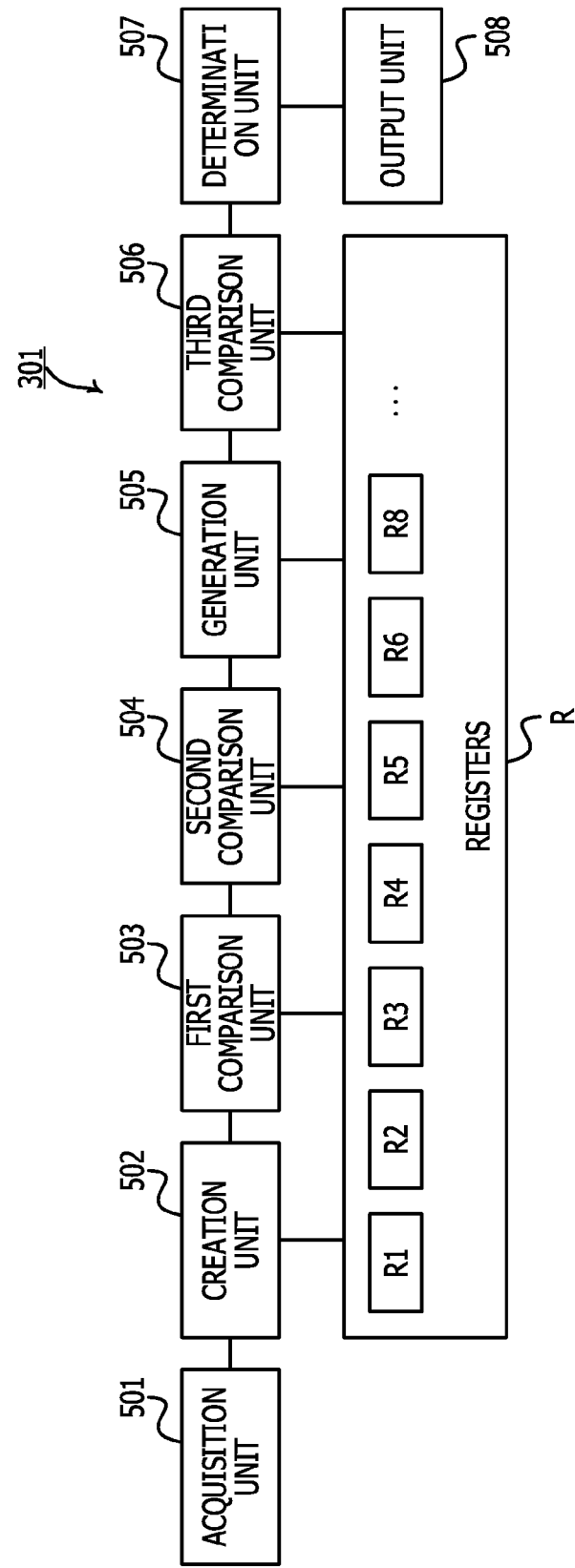
FIG. 5 illustrates an exemplary functional configuration of a database server.

FIG. 5 illustrates an exemplary functional configuration of a database server 301. In FIG. 5, the database server 301 includes an acquisition unit 501, a creation unit 502, a first comparison unit 503, a second comparison unit 504, a generation unit 505, a third comparison unit 506, a determination unit 507, and an output unit 508. As a specific example, the function of each functional unit is realized by causing the CPU 401 to execute a program stored in a storage device such as the memory 402 or the magnetic disk 405 illustrated in FIG. 4, or by the I/F 403, for example. In addition, each functional unit may also be realized by hardware, for example. As a specific example, each functional unit may be formed by elements such as a logical product (AND) circuit, a NAND circuit (inverter), a logical sum (OR) circuit, a negative logical sum (NOR) circuit, a latch (flip-flop (FF)) circuit, or the like. Processing results from each functional unit are stored in a storage device such as the memory 402 and the magnetic disk 405, for example.

The acquisition unit 501 includes a function of acquiring a bit sequence expressing a search character string. As a specific example, the acquisition unit 501 acquires a bit sequence expressing a search character string from a data search request from the client device 302. The acquisition unit 501 may also be configured to acquire a bit sequence expressing a search character string from user operation input performed using a keyboard and mouse (not illustrated), for example.

In addition, the acquisition unit 501 includes a function of acquiring a bit sequence expressing a target character string. As a specific example, the acquisition unit 501 acquires a bit sequence expressing a target character string from the database 320. As a more specific example, the acquisition unit 501 acquires a bit sequence expressing a target character string from data loaded from the database 320 into a database buffer (not illustrated) in the memory 402.

The creation unit 502 includes a function of storing 8 bytes' worth (corresponding to the second bit length l2) of a 1-byte (corresponding to the first bit length l1) bit sequence b1 included in the bit sequence expressing the search character string in a register R. As a specific example, the creation unit 502 stores 8 bytes' worth of a 1-byte bit sequence b1 from the start (or the end) of the bit sequence expressing the search character string in the register R1.

Additionally, the creation unit 502 includes a function of storing 8-byte bit sequences b2 and b3 included the bit sequence expressing the target character string in respectively difference registers R. The bit sequences b2 and b3 are consecutive bit sequences included in the bit sequence expressing the target character string. As a specific example, the creation unit 502 stores an 8-byte bit sequence b2 from the start of the bit sequence expressing the target character string in a register R2. The creation unit 502 also stores the next 8-byte bit sequence b3 after the bit sequence b2 from the bit sequence expressing the target character string in a register R3, for example.

Additionally, the creation unit 502 includes a function of storing an 8-byte bit sequence b4 included the bit sequence expressing the search character string in a register R. The first byte of the bit sequence b4 corresponds to the bit sequence b1. As a specific example, the creation unit 502 stores an 8-byte bit sequence b4 from the start of the bit sequence expressing the search character string in a register R4.

The first comparison unit 503 includes a function of batch comparing, in units of bytes, the 1-byte bit sequence b1 included in the bit sequence expressing the search character string and the 8-byte bit sequence b2 included in the bit sequence expressing the target character string. As a specific example, the first comparison unit 503 batch compares, in units of bytes, the bit sequence in the register R1 (8 bytes' worth of the bit sequence b1) and the bit sequence b2 in the register R2 by executing a specific compare instruction (for example, SIMD Compare).

The comparison result of the first comparison unit 503 is stored in the register R5, for example. As a specific example, the comparison result of the first comparison unit 503 is the 1-byte bit sequence b5 expressing the comparison result in units of bytes between the registers R1 and R2. Herein, the comparison result in units of bytes is set to "0" in the case of a non-match, while the comparison result in units of bytes is set to "1" in the case of a match.

The second comparison unit 504 includes a function of comparing the next 1-byte bit sequence b6 after the bit sequence b1 in the bit sequence expressing the search character string and the next 1-byte bit sequence b7 after a location matching the bit sequence b1 in the bit sequence expressing the target character string. As a specific example, the second comparison unit 504 compares the next 1-byte bit sequence b6 after the bit sequence b1 from the bit sequence b4 stored in the register R4 to the next 1-byte bit sequence b7 after a location matching the bit sequence b1 from the bit sequence b2 stored in the register R2. Accordingly, even for multibyte characters expressing a single character with multiple bytes such as SJIS, it is possible to determine from the comparison result of the second comparison unit 504 whether or not the target character string includes a character that matches a character in the search character string (for example, the first character).

Note that a location matching the bit sequence b1 in the bit sequence expressing the target character string may be specified from the bit sequence b5 expressing the comparison result of the first comparison unit 503, for example. For example, when the bit sequence b5 is "00001000", the second comparison unit 504 is able to specify that there is a location matching the bit sequence b1 at the 5th byte of the bit sequence b2 included in the bit sequence expressing the target character string.

Meanwhile, in some cases a location matching the bit sequence b1 does not exist in the bit sequence b2 included in the bit sequence expressing the target character string. In this case, the creation unit 502 sets and stores the next 8-byte bit sequence after the bit sequence b2 from the bit sequence expressing the target character string as a new bit sequence b2 in the register R2, for example. In addition, the creation unit 502 sets and stores the next 8-byte bit sequence after the new bit sequence b2 from the bit sequence expressing the target character string as a new bit sequence b3 in the register R3.

Note that the creation unit 502 may also be configured to store the next 8-byte bit sequence after the bit sequence b3 from the bit sequence expressing the target character string in the register R2. In this case, the target of comparison with the bit sequence b1 becomes the bit sequence in the register R3. In other words, the register R that stores the target of comparison with the bit sequence b1 may be switched between the registers R2 and R3.

The generation unit 505 includes a function of executing a bit operation instruction that generates an 8-byte bit sequence b8 from the location matching the bit sequence b1 in the bit sequence expressing the target character string. As a specific example, when the bit sequence b6 and the bit sequence b7 match, the generation unit 505 generates an 8-byte bit sequence b8 from the location matching the bit sequence b1 in the bit sequence expressing the target character string by executing Shift-Mask-OR.

Described in further detail, first, the generation unit 505 left-shifts the bit sequence b2 stored in the register R2 based on the comparison result of the first comparison unit 503. As a specific example, the generation unit 505 left-shifts the bit sequence b2 stored in the register R2 by the number of times "0" appeared before "1" appeared from the start of the bit sequence b5 expressing the comparison result of the first compare instruction. Subsequently, the generation unit 505 masks the bits of the shift origin (the emptied bits) of the register R2 with "0".

Next, the generation unit 505 right-shifts the bit sequence b3 stored in the register R3 based on the comparison result of the first comparison unit 503. As a specific example, the generation unit 505 right-shifts the bit sequence b3 stored in the register R3 by the value obtained by subtracting from the register size (8 bytes) the number of times "0" appeared before "1" appeared from the start of the bit sequence b5. Subsequently, the generation unit 505 masks the bits of the shift origin (the emptied bits) of the register R3 with "0".

Next, the generation unit 505 stores in the register R6 a bit sequence b8 obtained by concatenating the bit sequence in the register R2 and the bit sequence in the register R3 with an OR instruction. Consequently, an 8-byte bit sequence b8 that starts from the location matching the bit sequence b1 in the bit sequence expressing the target character string is generated.

Also, the generation unit 505 may be configured to not execute a bit operation instruction when the bit sequence b6 and the bit sequence b7 do not match. Consequently, for single-byte characters, it is possible to reduce the excess processing of conducting Shift-Mask-OR and SIMD Compare on data that just happens to match the first character only. As another example, for multibyte characters such as SJIS, the excess processing of conducting Shift-Mask-OR and SIMD Compare individually on candidates whose first characters do not even match is reduced.

The third comparison unit 506 includes a function of batch comparing, in units of bytes, the bit sequence b8 generated by the generation unit 505 and the 8-byte bit sequence b4 starting from the bit sequence b1 in the bit sequence expressing the search character string. As a specific example, the third comparison unit 506 batch compares, in units of bytes, the bit sequence b8 in the register R6 and the bit sequence b4 in the register R4 by executing a specific compare instruction (for example, SIMD Compare).

The comparison result of the third comparison unit 506 is stored in the register R7, for example. As a specific example, the comparison result of the third comparison unit 506 is the 1-byte bit sequence b9 expressing the comparison result in units of bytes between the registers R4 and R6. Herein, the comparison result in units of bytes is set to "0" in the case of a non-match, while the comparison result in units of bytes is set to "1" in the case of a match.

In addition, when the search character string and the target character string are multibyte characters, the second comparison unit 504 may be configured to determine whether or not a location matching the bit sequence b1 from the bit sequence b2 included in the bit sequence expressing the target character string is the first byte of a multibyte character. As a specific example, the second comparison unit 504 determines whether or not a location matching the bit sequence b1 is the first 1-byte bit sequence in a bit sequence expressing a given character of the target character string.

When the location matching the bit sequence b1 is not the first byte of a multibyte character, that location does not match a character of the search character string (for example, the first character). For this reason, the second comparison unit 504 may be configured to compare the bit sequence b6 and the bit sequence b7 when the location matching the bit sequence b1 is the first byte of a multibyte character.

Meanwhile, when the location matching the bit sequence b1 is not the first byte of a multibyte character, the creation unit 502 may be configured to set and store the next 8-byte bit sequence after the bit sequence b2 from the bit sequence expressing the target character string as a new bit sequence b2 in the register R2, for example. In addition, the creation unit 502 may be configured to set and store the next 8-byte bit sequence after the new bit sequence b2 from the bit sequence expressing the target character string as a new bit sequence b3 in the register R3. Note that exemplary character string search processing by the database server 301 for the case in which the search character string and the target character string are multibyte characters will be discussed later using FIGS. 6, 7, and 8.

In addition, the second comparison unit 504 may be configured to compare the next 1-byte bit sequence b10 after the bit sequence b6 in the bit sequence expressing the search character string and the next 1-byte bit sequence b11 after the bit sequence b7 in the bit sequence expressing the target character string. As a specific example, the second comparison unit 504 may be configured to compare the bit sequence b10 and the bit sequence b11 in the case in which the bit sequence b6 and the bit sequence b7 match when the search character string and the target character string are multibyte characters in which a single character is expressed with 3 bytes.

As an example, when the target character string "デジタルーテレビの普及" and the search character string "テレビ" become the following when expressed in UTF-8, which expresses a single character with 3 bytes.

[Target character string] デ (E3 83 87) ジ (E3 82 B8) タ (E3 82 BF) ル (E3 83 AB) テ (E3 83 86) レ (E3 83 AC) ビ (E3 83 93) の (E3 81 AE) 普 (E6 99 AE) 及 (E5 8F 8A)

[Search character string] テ (E3 83 86) レ (E3 83 AC) ビ (E8 83 93)

In this example, a larger portion of the bit sequence expressing the target character string matches up to the second byte of the first character "テ" of the search character string. In such cases, there is a risk that processing the target character string as an 8-byte character string and conducting an 8-byte comparison with an SIMD instruction may lead to great increases in the processing time taken by character string search.

For this reason, when the character encoding is UTF-8 or the like, the second comparison unit 504 additionally compares the next 1-byte bit sequence b10 after the bit sequence b6 and the next 1-byte bit sequence b11 after the bit sequence b7. Accordingly, even for multibyte characters expressing a single character with 3 bytes such as UTF-8, it is possible to determine whether or not the target character string includes a character that matches a character in the search character string (for example, the first character).

In addition, when the bit sequence b10 and the bit sequence b11 match, the generation unit 505 may be configured to execute a bit operation instruction that generates an 8-byte bit sequence b8 from the location matching the bit sequence b1 in the bit sequence expressing the target character string. In other words, when the character encoding is UTF-8 or the like, the generation unit 505 may be configured to execute a bit operation instruction in the case in which the bit sequence b10 and the bit sequence b11 match.

Consequently, for multibyte characters such as UTF-8, the excess processing of conducting Shift-Mask-OR and SIMD Compare individually on candidates whose first characters do not even match is reduced. As another example, even for single-byte characters, by executing a bit operation instruction in the case in which the bit sequence b10 and the bit sequence b11 match, it is possible to reduce the excess processing of conducting Shift-Mask-OR and SIMD Compare on data that just happens to match the first two characters only.

The determination unit 507 includes a function of determining whether or not the search character string is included in the target character string, based on the comparison result of the third comparison unit 506. As a specific example, the determination unit 507 determines that the search character string is included in the target character string in the case in which the number of consecutive 1s in the bit sequence b9 stored in the register R7 is equal to or greater than the length L of the search character string.

Herein, the number of consecutive 1s in the bit sequence b9 stored in the register R7 is the number of consecutive matches (number of bytes) from the comparison of the bit sequence b8 in the register R6 and the bit sequence b4 in the register R4. In the following description, the number of consecutive 1s in the bit sequence b9 stored in the register R7 may be designated "the comparison match count CN" in some cases.

Also, the length L of the search character string is determined according to the character encoding of the search character string. For example, in the case of single-byte characters that express a single character with one byte, provided that the character count of the search character string is m characters, the length L of the search character string becomes "L=m". Meanwhile, in the case of multibyte characters that express a single character with two bytes, provided that the character count of the search character string is m characters, the length L of the search character string becomes "L=2m". Meanwhile, in the case of multi-byte characters that express a single character with three bytes, provided that the character count of the search character string is m characters, the length L of the search character string becomes "L=3m".

In addition, when the comparison match count CN is less than the length L of the search character string, the determination unit 507 may be configured to determine whether or not the length L of the search character string is greater than 8n bytes. Note that the "8" of "8n" represents the 8-byte processing unit of the CPU 401 (corresponding to the second bit length l2). Also, the "n" of "8n" is the number of loops (n=1, 2, . . . ) over which the comparison process (for example, SIMD Compare) of the third comparison unit 506 is repeated.

At this point, when the length L of the search character string is 8n bytes or less, the determination unit 507 determines whether or not the bit sequence expressing the target character string includes a residual bit sequence that has not been compared to the bit sequence expressing the search character string. Subsequently, when a residual bit sequence that has not been compared to the bit sequence expressing the search character string does not exist, the determination unit 507 determines that the search character string is not included in the target character string.

On the other hand, when a residual bit sequence that has not been compared to the bit sequence expressing the search character string does exist, the creation unit 502 sets and stores the next 8-byte bit sequence after the bit sequence b2 from the bit sequence expressing the target character string as a new bit sequence b2 in the register R2, for example. In addition, the creation unit 502 sets and stores the next 8-byte bit sequence after the new bit sequence b2 from the bit sequence expressing the target character string as a new bit sequence b3 in the register R3, for example. Consequently, the residual bit sequence in the bit sequence expressing the target character string that has not been compared to the bit sequence expressing the search character string is compared to the bit sequence expressing the search character string.

In addition, when the length L of the search character string is greater than 8n bytes, the third comparison unit 506 compares the next 8-byte bit sequence after the bit sequence b8 in the bit sequence expressing the target character string to the next 8-byte bit sequence after the bit sequence b4 in the bit sequence expressing the search character string. In other words, when the length L of the search character string is greater than 8n bytes, not all of the search character string is compared to the target character string in one cycle of the comparison process. For this reason, the third comparison unit 506 compares the residual bit sequence in the bit sequence expressing the search character string that has not been compared to the bit sequence expressing the target character string to the bit sequence expressing the target character string.

As a specific example, the third comparison unit 506 sets and stores the next 8-byte bit sequence after the bit sequence b8 from the bit sequence expressing the target character string as a new bit sequence b8 in the register R6. In addition, the third comparison unit 506 sets and stores the next 8-byte bit sequence after the bit sequence b4 from the bit sequence expressing the search character string as a new bit sequence b4 in the register R4.

Subsequently, the third comparison unit 506 batch compares, in units of bytes, the bit sequence b8 in the register R6 and the bit sequence b4 in the register R4 by executing a specific compare instruction (for example, SIMD Compare). Consequently, the residual bit sequence in the bit sequence expressing the search character string that has not been compared to the bit sequence expressing the target character string is compared to the bit sequence expressing the target character string.

The output unit 508 includes a function of outputting a determination result determined by the determination unit 507. Herein, a determination result is information indicating whether or not the search character string is included in the target character string. For example, when the search character string is included in the target character string, the database server 301 transmits data including the target character string to the client device 302 as a search result in response to the search request from the client device 302. Meanwhile, when the search character string is not included in the target character string, the database server 301 transmits to the client device 302 a search result indicating that the data from the search request was not found, for example.

Figure 6:
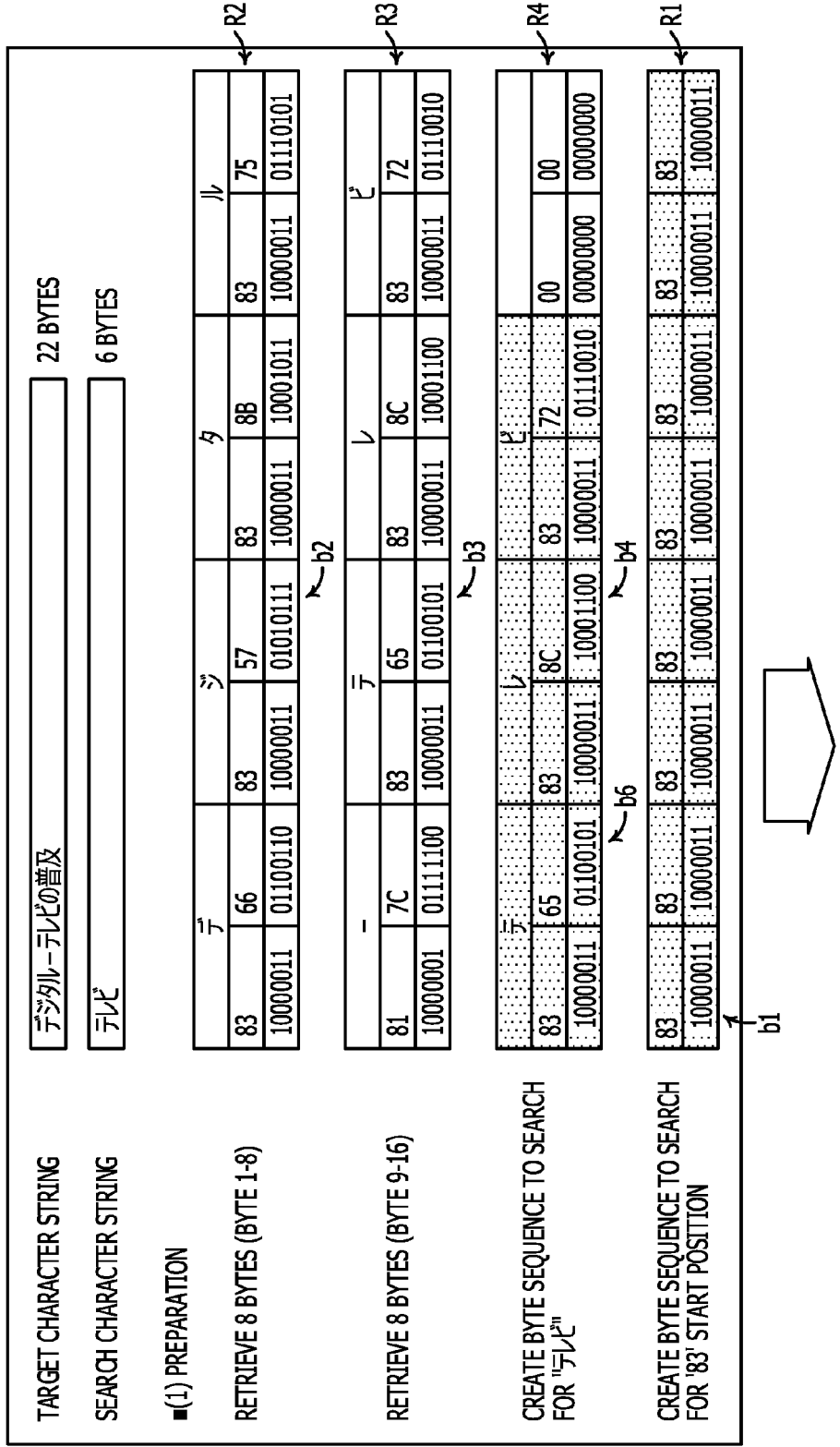
FIGS. 6, 7, and 8 illustrate exemplary character string search processing for the case of SJIS encoding.
Figure 7:
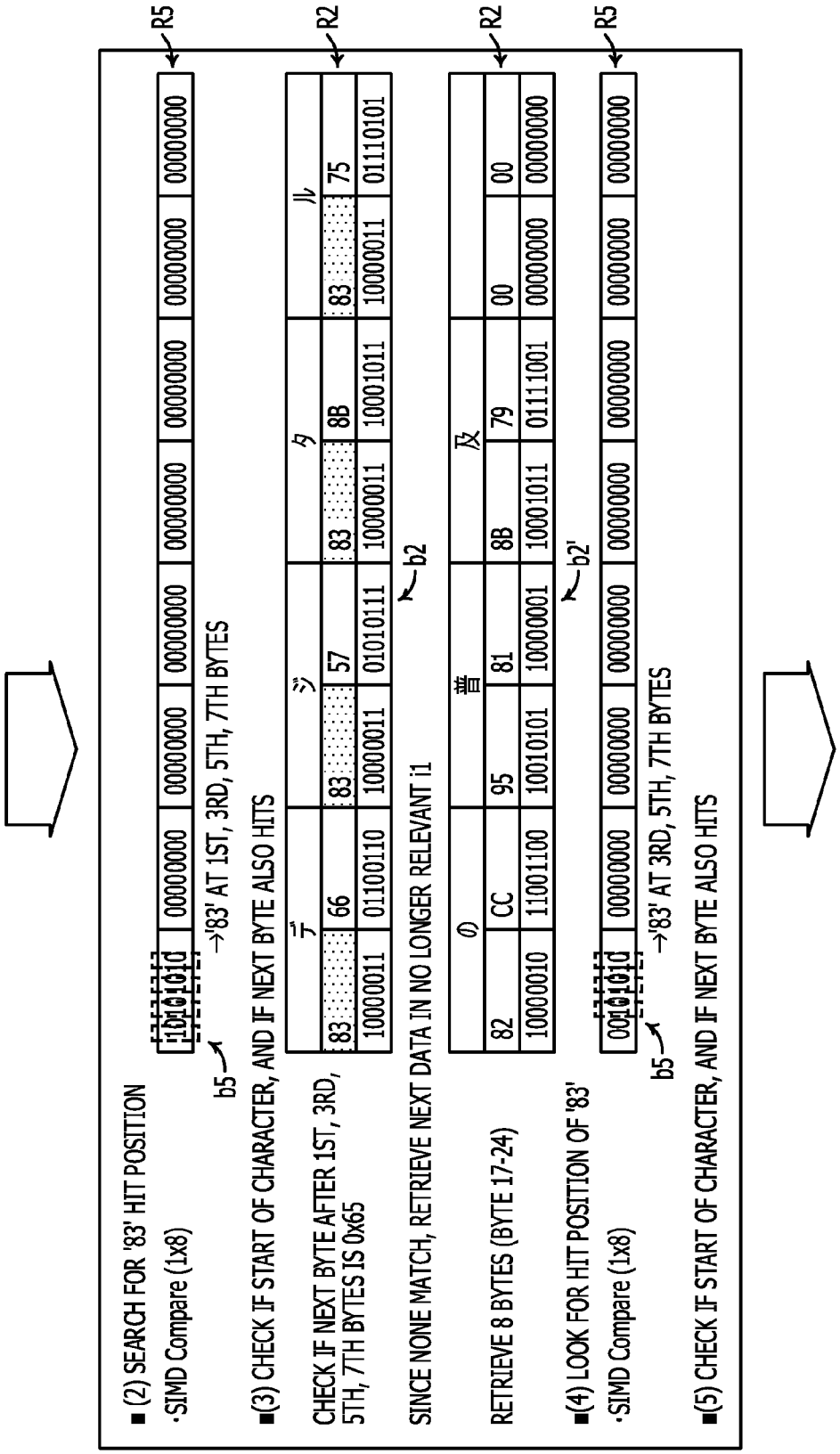
Figure 8:
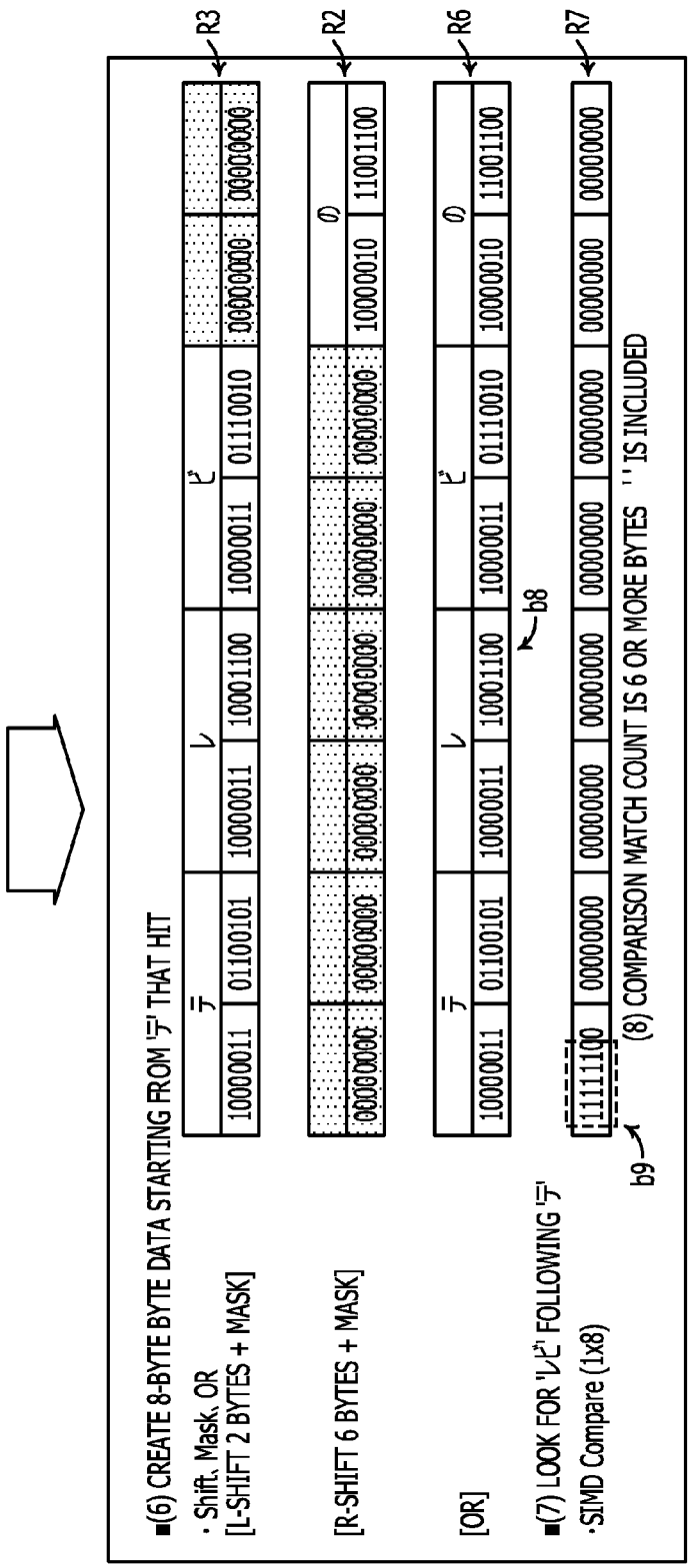

Exemplary Character String Search Processing for the Case of Multibyte Characters Next, FIGS. 6, 7, and 8 will be used to describe exemplary character string search processing by the database server 301 for the case in which the search character string and the target character string are multibyte characters. Herein, the case of SJIS encoding will be described as an example of multibyte characters.

FIGS. 6, 7, and 8 illustrate exemplary character string search processing for the case of SJIS encoding. In FIG. 6, the target character string is "テレビデジタル―テレビの普及", and is 22 bytes of data. Also, the search character string is "テレビ", and is 6 bytes of data.

(1) The creation unit 502 stores 8 bytes' worth of a 1-byte bit sequence b1 from the start of a bit sequence expressing the search character string in the register R1. In the example in FIG. 6, the bit sequence b1 "10000011" of the first byte of the 2-byte bit sequence expressing the first character "テ" of the search character string is stored in the register R1 eight times.

In addition, the creation unit 502 stores an 8-byte bit sequence b2 from the start of the bit sequence expressing the target character string in the register R2, and also stores the next 8-byte bit sequence b3 after the bit sequence b2 in the register R3. In the example in FIG. 6, a bit sequence b2 expressing the character string "デジタル" of the first four characters is stored in the register R2, and a bit sequence b3 expressing the character string "—テレビ" of the four characters starting from the 5th byte is stored in the register R3.

Also, the creation unit 502 stores an 8-byte bit sequence b4 from the start of the bit sequence expressing the search character string in the register R4. In the example in FIG. 6, a bit sequence b4 expressing the character string "テレビ" of the first three characters of the search character string is being stored in the register R4.

(2) The first comparison unit 503 batch compares, in units of bytes, the bit sequence in the register R1 (8 bytes' worth of the bit sequence b1) to the bit sequence in the register R2 (the bit sequence b2) by executing SIMD Compare, and stores the comparison result in the register R5. In the example in FIG. 7, a bit sequence b5 "10101010" expressing a comparison result of the first comparison unit 503 is being stored in the register R5. This bit sequence b5 specifies that "83 (the bit sequence b1)" exists at the 1st, 3rd, 5th, and 7th bytes.

(3) The second comparison unit 504 determines whether or not a location matching the bit sequence b1 in the bit sequence b2 included in the bit sequence expressing the target character string is the first byte of a multibyte character. As a specific example, the second comparison unit 504 determines whether or not the locations matching the bit sequence b1 in the bit sequence b2 (the 1st, 3rd, 5th, and 7th bytes) are odd bytes. In the example in FIG. 7, all locations matching the bit sequence b1 are a first byte.

Next, the second comparison unit 504 compares the next 1-byte bit sequence b6 after the bit sequence b1 in the bit sequence expressing the search character string to the next 1-byte bit sequence b7 after a location matching the bit sequence b1 in the bit sequence expressing the target character string. In the example in FIG. 6, the bit sequence b6 is "01100101". Also, the bit sequence b7 is the bit sequence of one of the 2nd, 4th, 6th, and 8th bytes of the bit sequence b2, and none of the bit sequences matches the bit sequence b6.

In this case, the creation unit 502 sets and stores the next 8-byte bit sequence after the bit sequence b3 in the bit sequence expressing the target character string (herein designated the "bit sequence b2") in the register R2.

(4) The first comparison unit 503 batch compares, in units of bytes, the bit sequence in the register R1 (8 bytes' worth of the bit sequence b1) to the bit sequence b3 in the register R3 by executing SIMD Compare, and stores the comparison result in the register R5. In the example in FIG. 7, a bit sequence b5 "00101010" expressing the comparison result of the first comparison unit 503 is being stored in the register R5. This bit sequence b5 specifies that "83 (the bit sequence b1)" exists at the 3rd, 5th, and 7th bytes.

(5) The second comparison unit 504 determines whether or not a location matching the bit sequence b1 in the bit sequence b3 in the register R3 is the first byte of a multibyte character. In the example in FIG. 6, all locations matching the bit sequence b1 in the bit sequence b3 in the register R3 are a first byte.

Next, the second comparison unit 504 compares the next 1-byte bit sequence b6 after the bit sequence b1 in the bit sequence expressing the search character string to the next 1-byte bit sequence b7 after a location matching the bit sequence b1 in the bit sequence b3 in the register R3. In the example in FIG. 6, the bit sequence b7 is the bit sequence of one of the 4th, 6th, and 8th bytes of the bit sequence b3 in the register R3, and the bit sequence at the 4th byte matches the bit sequence b6.

(6) The generation unit 505, by executing Shift-Mask-OR on the registers R2 and R3, generates and stores in the register R6 an 8-byte bit sequence b8 starting from the location matching the bit sequence b1 in the bit sequence expressing the target character string. In the example in FIG. 8, an 8-byte bit sequence b8 that starts from the location matching the bit sequence b1 in the bit sequence expressing the target character string is generated.

(7) The third comparison unit 506 batch compares, in 1-byte units, the bit sequence in the register R6 (the bit sequence b8) to the bit sequence in the register R4 (the bit sequence b4) by executing SIMD Compare, and stores the comparison result in the register R7. In the example in FIG. 8, a bit sequence b9 "11111100" expressing the comparison result of the third comparison unit 506 is being stored in the register R7.

(8) The determination unit 507 determines that the search character string is included in the target character string in the case in which the number of consecutive 1s in the bit sequence b9 in the register R7 is equal to or greater than the length L of the search character string. Herein, the length L of the search character string is 6. The number of consecutive 1s in the bit sequence b9 is also 6. For this reason, the determination unit 507 determines that the search character string is included in the target character string.

In this way, according to the database server 301, for multibyte characters such as SJIS, Shift-Mask-OR and SIMD Compare are conducted on candidates whose first characters match, and then an advanced search is conducted.

Character String Search Processing Sequence of Database Server 301

Next, a character string search processing sequence of database server 301 will be described. Herein, the case in which the search character string and the target character string are multibyte characters will be described as an example.

Figure 9:
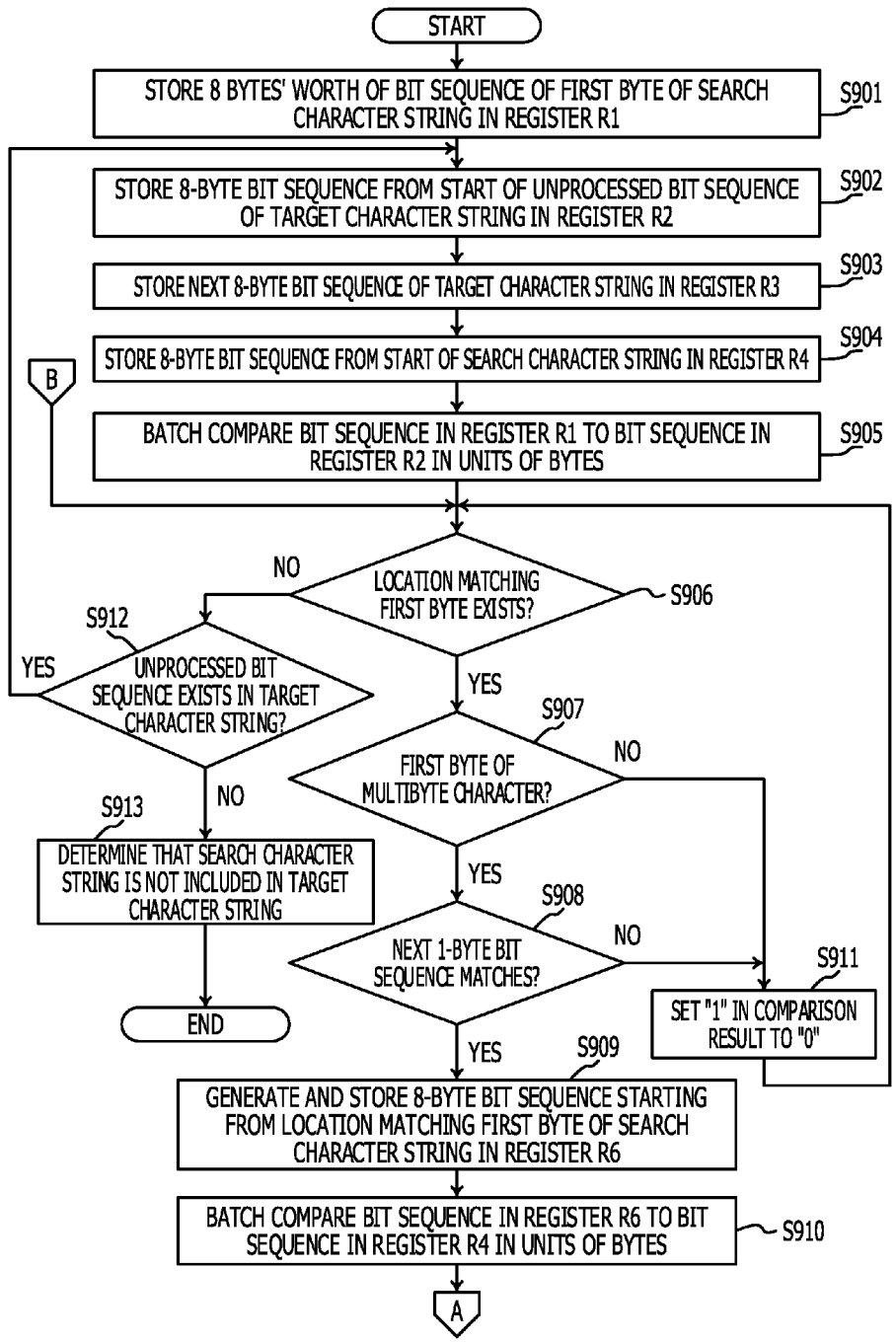
FIGS. 9 and 10 are flowcharts illustrating an example of a character string search processing sequence of a database server.
Figure 10:
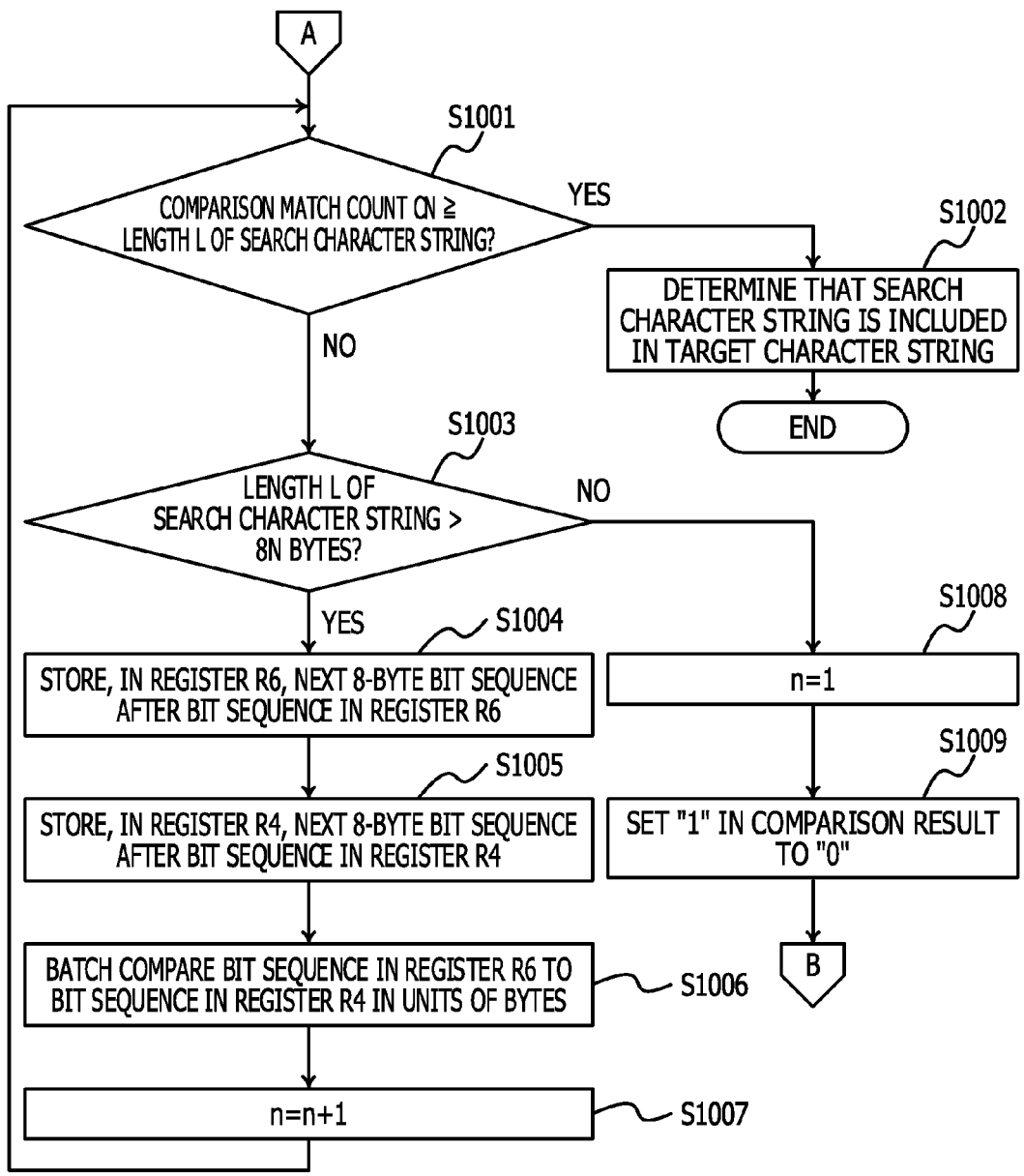

FIGS. 9 and 10 are flowcharts illustrating an example of a character string search processing sequence of the database server 301. In the flowchart in FIG. 9, first, the database server 301 stores 8 bytes' worth of the bit sequence of the first byte of the bit sequence expressing the search character string in the register R1 (step S901).

Next, the database server 301 stores an 8-byte bit sequence from the start of the unprocessed bit sequence in the bit sequence expressing the target character string in the register R2 (step S902). Note that an unprocessed bit sequence refers to the remaining bit sequence that has not been compared to the bit sequence in the register R1 from the bit sequence expressing the target character string.

Next, the database server 301 stores the next 8-byte bit sequence after the bit sequence in the register R2 from the bit sequence expressing the target character string in the register R3 (step S903). Next, the database server 301 stores an 8-byte bit sequence from the start of the bit sequence expressing the search character string in the register R4 (step S904).

Subsequently, the database server 301 batch compares, in units of bytes, the bit sequence in the register R2 to the bit sequence in the register R2 by executing SIMD Compare, and stores the comparison result in the register R5 (step S905). Next, based on the comparison result, the database server 301 determines whether or not a location matching the bit sequence of the first byte of the search character string exists in the bit sequence in the register R2 (step S906).

When a location matching the bit sequence of the first byte of the search character string does exist (step S906:

Yes), the database server 301 determines whether or not the location matching the bit sequence of the first byte of the search character string from the bit sequence in the register R2 is the first byte of a multibyte character (step S907).

In the case of the first byte of a multibyte character (step S907: Yes), the database server 301 determines whether or not the bit sequence of the next 1 byte after the bit sequence of the first byte in the bit sequence expressing the search character string matches the bit sequence of the next 1 byte after the location matching the bit sequence of the first byte of the search character string in the bit sequence expressing the target character string (step S908).

When the bit sequences match (step S908: Yes), the database server 301, by executing Shift-Mask-OR on the registers R2 and R3, generates and stores in the register R6 an 8-byte bit sequence starting from the location matching the bit sequence of the first byte of the search character string in the bit sequence expressing the target character string (step S909).

Subsequently, the database server 301 batch compares, in units of bytes, the bit sequence in the register R6 to the bit sequence in the register R4 by executing SIMD Compare, stores the comparison result in the register R7 (step S910), and proceeds to step S1001 illustrated in FIG. 10.

Meanwhile, in step S907, when not the first byte of a multibyte character (step S907: No), the database server 301 changes the first "1" in the bit sequence expressing the comparison result stored in the register R5 to "0" (step S911), and returns to step S906. Also, in step S908, when the bit sequences do not match (step S908: No), the database server 301 proceeds to step S911.

Meanwhile, in step S906, when a location matching the bit sequence of the first byte of the search character string does not exist (step S906: No), the database server 301 determines whether or not an unprocessed bit sequence exists in the bit sequence expressing the target character string (step S912). At this point, when an unprocessed bit sequence does exist (step S912: Yes), the database server 301 returns to step S902.

On the other hand, when an unprocessed bit sequence does not exist (step S912: No), the database server 301 determines that the search character string is not included in the target character string (step S913), and ends the series of processes in this flowchart.

In the flowchart in FIG. 10, first, the database server 301 determines whether or not the comparison match count CN is equal to or greater than the length L of the search character string, based on the bit sequence expressing the comparison result stored in the register R7 (step S1001). When the comparison match count CN is equal to or greater than the length L of the search character string (step S1001: Yes), the database server 301 determines that the search character string is included in the target character string (step S1002), and ends the series of processes in this flowchart.

On the other hand, when the comparison match count CN is less than the length L of the search character string (step S1001: No), the database server 301 determines whether or not the length L of the search character string is greater than 8n bytes (step S1003). Note that the initial value of "n" is "n=1".

At this point, when the length L of the search character string is greater than 8n bytes (step S1003: Yes), the database server 301 stores the next 8-byte bit sequence after the bit sequence in the register R6 from the bit sequence expressing the target character string in the register R6 (step S1004). Next, the database server 301 stores the next 8-byte bit sequence after the bit sequence in the register R4 from the bit sequence expressing the target character string in the register R4 (step S1005).

Subsequently, the database server 301 batch compares, in units of bytes, the bit sequence in the register R6 to the bit sequence in the register R4 by executing SIMD Compare, and stores the comparison result in the register R7 (step S1006). However, the comparison result is sequentially stored from the start of the unused part of the register R7.

Next, the database server 301 increments "n" (step S1007), and returns to step S1001. Meanwhile, in step S1003, when the length L of the search character string is less than or equal to 8n bytes (step S1003: No), the database server 301 initializes "n" to "n=1" (step S1008).

Subsequently, the database server 301 changes the first "1" in the bit sequence expressing the comparison result stored in the register R5 to "0" (step S1009), and returns to step S906 illustrated in FIG. 9.

Consequently, by conducting an advanced search using Shift-Mask-OR after conducting a preliminary screening using SIMD Compare, the question of whether or not the search character string is included in the target character string is efficiently determined. Note that in the case of multibyte characters that express a single character with 3 bytes, a match judgment of the next 1-byte bit sequence may additionally be conducted in step S908 illustrated in FIG. 9.

As described above, according to a database server 301 in accordance with an embodiment, it is possible to use a specific compare instruction (for example, SIMD Compare) to batch compare, in units of bytes, a 1-byte bit sequence b1 from the start of the search character string to an 8-byte bit sequence b2 included in the bit sequence expressing the target character string (for example, the first 8 bytes). Consequently, bit sequences are quickly compared to each other, and hit positions of the first byte of the search character string are detected from the bit sequence expressing the target character string. For example, in the case of single-byte characters that express a single character with 1 byte, such as ASCII, it is determined whether or not the first character of the search character string returns a hit in the target character string.

Also, according to the database server 301, the next 1-byte bit sequence b6 after the bit sequence b1 in the search character string is compared to the next 1-byte bit sequence b7 after a location matching the bit sequence b1 in the target character string. Consequently, it is determined whether or not the first character of the search character string returns a hit in the target character string, even for multibyte characters that express a single character with 2 bytes, such as SJIS. In addition, for single-byte characters, it is determined whether or not the next character after the first character of the search character string also returns a hit in the target character string.

In addition, according to the database server 301, when the bit sequence b6 and the bit sequence b7 match, a specific bit operation instruction (for example, Shift-Mask-OR) is used to generate an 8-byte bit sequence b8 starting from the location matching the bit sequence b1 in the bit sequence expressing the target character string. Also, according to the database server 301, a specific compare instruction (for example, SIMD Compare) is used to batch compare, in units of bytes, the generated bit sequence b8 to the 8-byte bit sequence b4 from the start of the search character string.

Consequently, bit sequences are quickly compared to each other, and an 8-byte bit sequence from the start of the search character string is detected from the bit sequence expressing the target character string. Also, since the specific bit operation instruction is not executed when the bit sequence b6 and the bit sequence b7 do not match, increases in processing time taken by character string search are minimized. For example, in the case of single-byte characters, it is possible to reduce the excess processing of conducting Shift-Mask-OR and SIMD Compare on data that just happens to match the first character only. As another example, in the case of multibyte characters, the excess processing of conducting Shift-Mask-OR and SIMD Compare individually on candidates whose first characters do not even match is reduced.

In addition, according to the database server 301, the question of whether or not the search character string is included in the target character string is determined based on the comparison result from comparing, in units of bytes, the bit sequence b8 to the bit sequence b4. For example, the database server 301 determines that the search character string is included in the target character string when the number of consecutive 1s in a bit sequence b9 expressing the comparison result from comparing the bit sequence b8 and the bit sequence b4 is equal to or greater than the length L of the search character string.

Consequently, a target character string that includes the search character string is found by search. As a result, the database server 301 transmits data including the target character string to the client device 302 as a search result in response to a data search request from the client device 302, for example.

In addition, according to the database server 301, in the case of multibyte characters, it is determined whether or not a location matching the bit sequence b1 from the bit sequence b2 included in the bit sequence expressing the target character string is the first byte of a multibyte character. Additionally, according to the database server 301, the bit sequence b6 and the bit sequence b7 are compared when the location matching the bit sequence b1 in the bit sequence b2 is the first byte of a multibyte character. Consequently, for multibyte characters, the excess processing of conducting Shift-Mask-OR and SIMD Compare individually on candidates whose first bytes do not even match is reduced.

In addition, according to the database server 301, in the case of multibyte characters that express a single character with 3 bytes, the next 1-byte bit sequence b10 after the bit sequence b6 in the search character string is compared to the next 1-byte bit sequence b11 after the bit sequence b7 in the target character string. Accordingly, even for multibyte characters expressing a single character with 3 bytes such as UTF-8, it is determined whether or not the target character string includes a character that matches a character in the search character string (for example, the first character).

In addition, according to the database server 301, when the bit sequence b10 and the bit sequence b11 match, a specific bit operation instruction is used to generate an 8-byte bit sequence b8 starting from the location matching the bit sequence b1 in the bit sequence expressing the target character string. Consequently, for multibyte characters such as UTF-8, the excess processing of conducting Shift-Mask-OR and SIMD Compare individually on candidates whose first characters do not even match is reduced.

Given the above, according to the database server 301, a specific compare instruction such as SIMD Compare is used to quickly conduct a preliminary screening, and an advanced search using a specific bit operation instruction such as Shift-Mask-OR is efficiently conducted. Consequently, the processing time taken by character string search is potentially shortened, improving the processing performance related to data search. For example, by conducting character string comparison in multibyte units N (for example, 8 bytes), the search cost is reduced to approximately 1/N compared to the case of conducting character string comparison in byte units.

Note that the character string search method described by the present embodiment may be realized by executing a program prepared in advance on a computer such as a personal computer or workstation. The character string search program is executed by being recorded onto a computer-readable recording medium such as a hard disk, flexible disk, CD-ROM, MO, or DVD, and by being retrieved from the recording medium by the computer. In addition, the character string search program may also be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of searching character string, the method comprising:
   first comparing, in units of a first bit length, a first bit sequence of the first bit length included in a search character bit sequence corresponding to a search character string to a second bit sequence of a second bit length included in a target character bit sequence corresponding to a target character string;
   when a third bit sequence of the first bit length following the first bit sequence in the search character bit sequence matches a fourth bit sequence of the first bit length following a location matching the first bit sequence in the second bit sequence, creating a fifth bit sequence of the second bit length starting from a location matching the first bit sequence in the target character bit sequence;
   second comparing, in units of the first bit length, the fifth bit sequence to a sixth bit sequence of the second bit length starting from the first bit sequence in the search character bit sequence; and
   determining, based on a result of the second comparing, whether or not the search character string is included in the target character string.

2. The method according to claim 1, further comprising:
   when the search character string and the target character string are a specific character encoding, in a case in which the third bit sequence and the fourth bit sequence match, comparing a seventh bit sequence of the first bit length following the third bit sequence in the search character bit sequence to an eighth bit sequence of the first bit length following the fourth bit sequence in the target character bit sequence,
   wherein the creating is executed when the seventh bit sequence and the eighth bit sequence match.

3. The method according to claim 1, wherein
   the first bit length is 1 byte, and
   the second bit length is a bit length expressing a unit of processing of a compare instruction that batch compares bit sequences to each other in units of bytes.

4. The method according to claim 3, further comprising:
third comparing the third bit sequence to the fourth bit sequence when the search character string and the target character string are multibyte characters, and a location matching the first bit sequence in the second bit sequence is a first byte of a multibyte character.

5. The method according to claim 1, further comprising:
storing a bit sequence from the first bit sequence and equal in length to the second bit length in a first register; and
storing the second bit sequence in a second register,
wherein the first comparing compares, in units of the first bit length, the bit sequence stored in the first register to the bit sequence stored in the second register.

6. The method according to claim 5, further comprising:
storing a ninth bit sequence of the second bit length following the second bit sequence in the target character bit sequence in a third register;
in the second register, left-shifting the bit sequence and first masking bits of the shift origin; and
in the third register, right-shifting the bit sequence and second masking bits of the shift origin;
wherein the creating creates the fifth bit sequence by taking a logical OR of a bit sequence stored in the second register after the first masking, and a bit sequence stored in the third register after the second masking.

7. The method according to claim 6, further comprising:
storing a bit sequence of the second bit length starting from the first bit sequence in the search character bit sequence in a fourth register; and
storing the fifth bit sequence in a fifth register;
wherein the second comparing compares, in units of the first bit length, a bit sequence stored in the fourth register to a bit sequence stored in the fifth register.

8. The method according to claim 5, further comprising:
when the second bit sequence does not include a bit sequence matching the first bit sequence, storing the ninth bit sequence in the second register as the second bit sequence.

9. A character string searching device comprising:
a memory; and
a processor coupled to the memory and configured to execute a process including:
first comparing, in units of a first bit length, a first bit sequence of the first bit length included in a search character bit sequence corresponding to a search character string to a second bit sequence of a second bit length included in a target character bit sequence corresponding to a target character string,
when a third bit sequence of the first bit length following the first bit sequence in the search character bit sequence matches a fourth bit sequence of the first bit length following a location matching the first bit sequence in the second bit sequence, creating a fifth bit sequence of the second bit length starting from a location matching the first bit sequence in the target character bit sequence,
second comparing, in units of the first bit length, the fifth bit sequence to a sixth bit sequence of the second bit length starting from the first bit sequence in the search character bit sequence, and
determining, based on a result of the second comparing, whether or not the search character string is included in the target character string.

10. The character string searching device according to claim 9, the process further including:
when the search character string and the target character string are a specific character encoding, in a case in which the third bit sequence and the fourth bit sequence match, comparing a seventh bit sequence of the first bit length following the third bit sequence in the search character bit sequence to an eighth bit sequence of the first bit length following the fourth bit sequence in the target character bit sequence,
wherein the creating is executed when the seventh bit sequence and the eighth bit sequence match.

11. The character string searching device according to claim 9, wherein
the first bit length is 1 byte, and
the second bit length is a bit length expressing a unit of processing of a compare instruction that batch compares bit sequences to each other in units of bytes.

12. The character string searching device according to claim 11, the process further including:
third comparing the third bit sequence to the fourth bit sequence when the search character string and the target character string are multibyte characters, and a location matching the first bit sequence in the second bit sequence is a first byte of a multibyte character.

13. The character string searching device according to claim 9, the process further including:
storing a bit sequence from the first bit sequence and equal in length to the second bit length in a first register, and
storing the second bit sequence in a second register,
wherein the first comparing compares, in units of the first bit length, the bit sequence stored in the first register to the bit sequence stored in the second register.

14. The character string searching device according to claim 13, the process further including:
storing a ninth bit sequence of the second bit length following the second bit sequence in the target character bit sequence in a third register,
in the second register, left-shifting the bit sequence and first masking bits of the shift origin, and
in the third register, right-shifting the bit sequence and second masking bits of the shift origin,
wherein the creating creates the fifth bit sequence by taking a logical OR of a bit sequence stored in the second register after the first masking, and a bit sequence stored in the third register after the second masking.

15. The character string searching device according to claim 14, the process further including:
storing a bit sequence of the second bit length starting from the first bit sequence in the search character bit sequence in a fourth register, and
storing the fifth bit sequence in a fifth register,
wherein the second comparing compares, in units of the first bit length, a bit sequence stored in the fourth register to a bit sequence stored in the fifth register.

16. The character string searching device according to claim 13, the process further including:
when the second bit sequence does not include a bit sequence matching the first bit sequence, storing the ninth bit sequence in the second register as the second bit sequence.

17. A non-transitory computer readable recording medium storing a program causing a computer to execute a process, the process comprising:
first comparing, in units of a first bit length, a first bit sequence of the first bit length included in a search character bit sequence corresponding to a search character string to a second bit sequence of a second bit length included in a target character bit sequence corresponding to a target character string;

when a third bit sequence of the first bit length following the first bit sequence in the search character bit sequence matches a fourth bit sequence of the first bit length following a location matching the first bit sequence in the second bit sequence, creating a fifth bit sequence of the second bit length starting from a location matching the first bit sequence in the target character bit sequence;

second comparing, in units of the first bit length, the fifth bit sequence to a sixth bit sequence of the second bit length starting from the first bit sequence in the search character bit sequence; and determining, based on a result of the second comparing, whether or not the search character string is included in the target character string.

18. The non-transitory computer readable recording medium according to claim 17, the process further comprising:

when the search character string and the target character string are a specific character encoding, in a case in which the third bit sequence and the fourth bit sequence match, comparing a seventh bit sequence of the first bit length following the third bit sequence in the search character bit sequence to an eighth bit sequence of the first bit length following the fourth bit sequence in the target character bit sequence, wherein the creating is executed when the seventh bit sequence and the eighth bit sequence match.

19. The non-transitory computer readable recording medium according to claim 17, wherein the first bit length is 1 byte, and the second bit length is a bit length expressing a unit of processing of a compare instruction that batch compares bit sequences to each other in units of bytes.

20. The non-transitory computer readable recording medium according to claim 17, the process further comprising:

storing a bit sequence from the first bit sequence and equal in length to the second bit length in a first register; and storing the second bit sequence in a second register, wherein the first comparing compares, in units of the first bit length, the bit sequence stored in the first register to the bit sequence stored in the second register.

* * * * *